United States Patent [19]

Adamson et al.

[11] Patent Number: 5,270,380
[45] Date of Patent: Dec. 14, 1993

[54] METHOD FOR EXTENDING THE OPEN TIME OF AN AQUEOUS COATING COMPOSITION

[75] Inventors: Linda A. Adamson, East Greenville; Richard F. Merritt, Fort Washington; Asare Nkansah, Lansdale; Jungsik Lee, Horsham, all of Pa.

[73] Assignee: Rohm and Haas Company, Philadelphia, Pa.

[21] Appl. No.: 959,879

[22] Filed: Oct. 13, 1992

[51] Int. Cl.$^5$ ............................................. C08L 75/04
[52] U.S. Cl. ...................... 524/556; 524/557; 524/559; 524/560; 524/561; 524/562; 524/563; 524/564; 524/803; 524/804
[58] Field of Search ............... 524/556, 557, 559, 560, 524/561, 562, 563, 564, 803, 804

[56] References Cited

U.S. PATENT DOCUMENTS

| | | | |
|---|---|---|---|
| 4,647,610 | 3/1987 | Sperry et al. | 524/377 |
| 4,923,514 | 5/1990 | Brown | 524/242 |
| 4,952,622 | 8/1990 | Chauvel et al. | 524/376 |

Primary Examiner—Maurice J. Welsh
Attorney, Agent, or Firm—James G. Vouros

[57] ABSTRACT

A method for extending the open time of an aqueous coating composition is provided. This method extends the time during which an aqueous coating can be applied or rebrushed without damaging the film. The open time improvement of this invention is useful for a variety of coatings including paints, stains, varnishes, adhesives, and inks. The aqueous coating composition contains a latex polymer and a modifying compound. More particularly, the latex polymer contains a first reactable group which is complementary to and reacts with a second reactable group in the modifying compound. The complementary reactable groups in the latex polymer and modifying compound provide ionic or covalent binding.

14 Claims, No Drawings

METHOD FOR EXTENDING THE OPEN TIME OF AN AQUEOUS COATING COMPOSITION

FIELD OF THE INVENTION

This invention relates to a method of increasing the time that an aqueous coating remains workable after it has been applied to a substrate. The method requires forming an aqueous coating by combining a selected modifying compound and a latex polymer, and applying the coating so formed to a substrate. More particularly, the modifying compound and the latex polymer contain complementary reactable groups. This invention also relates to the aqueous coating composition which remains workable after it has been applied to a substrate.

BACKGROUND OF THE INVENTION

Aqueous dispersions containing polymers such as paints, stains, adhesives, and printing inks are being increasingly used because of their safety, economy, ease of application, and ease of clean-up. Aqueous coatings such as latex paints, dry quickly compared to solvent coatings such as alkyd paints. Because of the faster drying time of aqueous coatings relative to solvent coatings, a second coat can be applied in a short time, for example, from about 3 to about 5 hours. However, because of the fast drying nature of aqueous coatings, there is often not enough time to rebrush over the freshly coated wet surface to improve its appearance or to apply additional paint onto the freshly coated wet surface without causing defects such as brush marks, loss of gloss, or lap lines in the final dried coating. A "lap" as used herein, refers to an area on a substrate where additional coating is applied onto a portion of a previously coated, but still wet, adjacent substrate area.

In the case of paint, it is desirable to seamlessly join up the edges of a wet painted area with newly added fresh paint without any visible lap showing in the dried coating. "Lapping" or "to lap" refers to the ability to do this seamless joining of edges without leaving a visible "lap" line.

As used herein, "open time" or "wet-edge time" refers to the time that a coating remains workable, after it has been applied to a substrate, to allow for rebrushing or "melting in" of the newly applied coating at the lap, without resulting in the above defects. Open time is a more apparent problem in cases where other than a flat or dull surface appearance is desired, such as with sheen and gloss paints, because a glossy appearance makes the surface defects more visible.

During the drying of the aqueous coating, as water evaporates, latex polymer particles deform and fuse together to form a continuous film. This process, known as "film formation" or "coalescence", is irreversible since the addition of water onto the dried or drying coating will not redisperse the polymer particles. Once coalescence occurs, it is impossible to rebrush the aqueous coating and lap into a previously coated area.

The drying characteristics of aqueous coatings such as dry time, flow and gloss of the dried coating, are not easily controlled, because they are dependent on how fast the water in the coating evaporates. The drying behavior of aqueous coatings depends on the temperature, humidity and air velocity at the time of application and thereafter. For example, coatings can dry almost instantaneously under hot, dry, or windy conditions leading to poor lapping characteristics and short open times. In addition, these conditions tend to also impair the quality of film formation which can result in cracks, poor flow, low gloss, and poor adhesion to the substrate.

Polymeric compositions dispersed in organic solvents have different drying characteristics than the aqueous polymeric coatings because solvents or solvent blends tend to have a wide range of boiling points and evaporation rates compared to water. This range of boiling points can be used to modify the drying characteristics of the solvent based coating according to the specific application requirements. For example, alkyd paints are made with hydrocarbon solvents which are selected so that the drying rate is sufficient to minimize sagging, running, and dust pickup, while permitting good "melting in" at the lap. The disadvantages of such organic solvent based coatings include the difficulties in clean-up, the toxic nature of organic solvents, pollution, odor, stickiness of the dried paint film, such as for example, tack, and the relatively high cost of organic solvents.

The conventional practice for addressing the quick drying nature of aqueous coatings has been to add substantial levels of water-soluble solvents, such as for example, 10 to 20 percent or more based on total liquid content, to such coatings to increase the open time. These techniques are discussed by M. D. Andrews, "Influence of Ethylene and Propylene Glycols on Drying Characteristics of Latex Paints," *Journal of Paint Technology*, vol. 46, page 40 (1974); D. A. Sullivan, "Water and Solvent Evaporation from Latex and Latex Paint Films," *Journal of Paint Technology*, vol. 47, page 60 (1975); and C. R. Martens, *Waterborne Coatings*, Van Nostrand Reinhold, page 153 (1981). These references discuss the use of short chain water-soluble alcohols and glycols as cosolvents in aqueous coatings to aid coalescence of the latex particles, improve leveling, and prolong open time. However, these cosolvents negate the intrinsic advantages of aqueous coatings such as safety, low tack, low odor, and low pollution.

DESCRIPTION OF THE PRIOR ART

Another approach for increasing the open time of aqueous coatings has been the use of surface active evaporation suppressants to control water evaporation. U.S. Pat. No. 4,647,610 discloses a method of reducing the evaporation rate of water from aqueous polymeric coatings, such as latex coatings, by incorporating low levels of surface-active, aliphatic compounds having a saturated, unbranched carbon-carbon chain length of about 16 atoms or greater, and containing one or more hydrophilic groups. The evaporation suppressants preferably include the long, straight-chain alcohols, ether alcohols, and salts of carboxylic acids. These alcohols and salts are believed to increase the open time of an aqueous coating by reducing the rate of evaporation of water through the formation of highly compact and dense monolayers at the air/water interface. The '610 patent does not teach a method of increasing the open time of an aqueous coating formed with a modifying compound that is complementary to and reacts with the latex polymer.

U.S. Pat. No. 4,952,622 discloses the preparation of polymer particles which carry, implanted on their surface, amphiphilic molecules with ion-forming or reactive groups. The process requires contacting a latex of particles with an amphiphilic compound within the glass transition zone of the polymer, until the hydrophobic block of the amphiphilic compound is "enmeshed" with the macromolecular chains of the polymer. The '622 patent discloses the use of these particles and their dispersions in biological applications but does not disclose or suggest that these particles could be used to improve the open time of an aqueous coating.

SUMMARY OF THE INVENTION

This invention relates to a method of extending the open time of an aqueous coating containing a latex polymer. The method requires selecting a latex polymer having a first reactable group and selecting a modifying compound containing a second reactable group which is complementary to the first reactable group in the latex polymer, forming an aqueous coating by combining the modifying compound and the latex polymer, and applying the aqueous coating so combined to a substrate. This invention also relates to the aqueous coating composition having extended open time.

DETAILED DESCRIPTION OF THE INVENTION

This invention is directed to a method of extending the open time of an aqueous coating containing a latex polymer, such as for example, latex paints. The open time improvement of this invention is also useful with other aqueous polymeric coating compositions such as for example, paints, stains, varnishes, adhesives, and inks. This invention requires an aqueous coating containing a latex polymer and a selected modifying compound having complementary reactable groups. The polymers which can be employed in the aqueous coating include, for example, emulsion polymers, and colloidal dispersions, such as those described by C. R. Marten, *Waterborne Coatings*, Van Nostrand Reinhold, pages 41–51 (1981).

The complementary reactable groups in the latex polymer and modifying compound provide ionic or covalent binding. Complementary ionic binding includes acid-base interaction and ion pair binding of negatively and positively charged atoms.

Covalent binding by complementary reactable groups may include:
(a) acetoacetate-aldehyde;
(b) acetoacetate-amine;
(c) amine-aldehyde;
(d) amine-anhydride;
(e) amine-isocyanate;
(f) amine-epoxy;
(g) aldehyde-hydrazide;
(i) acid-epoxy;
(j) acid-carbodiimide;
(k) acid-chloro methyl ester;
(l) acid-chloro methyl amide;
(m) acid-anhydride;
(n) acid-aziridine;
(o) epoxy-mercaptan; and
(p) isocyanate-alcohol.
The first or second reactable group in each pair may be present in the latex polymer or in the modifying compound.

The latex polymer is an emulsion polymer having at least one reactable group. In addition, the latex polymer may contain more than one reactable group. More preferably, the latex polymer is an emulsion polymer with a reactable ionizable acid group such as for example, acrylic, methacrylic, itaconic, aconitic, citraconic, crotonic, maleic, fumaric, the dimer of acrylic acid, vinyl sulfonic acid, acrylamido-2-methylpropanesulfonic acid (AMPS), phosphonoethyl methacrylate (PEM), sulfonoethyl methacrylate (SEM) and so on.

Suitable emulsion polymers useful in the aqueous coatings of this invention may be made by conventional emulsion polymerization techniques well known in the art. It is preferred that the latex polymer is an emulsion homopolymer or copolymer, more preferably an emulsion polymer formed from a vinyl monomer, such as vinyl acetate, an acrylic monomer, or a styrenic monomer, such as those typically used in making water based paints, stains, adhesives, and varnishes.

The preferred latex polymers include homopolymers and copolymers of: (1) vinyl esters of an aliphatic acid having 1 to 18 carbon atoms, most preferably vinyl acetate; (2) acrylic acid esters and methacrylic acid esters of an alcohol having 1 to 18 carbon atoms, most preferably methyl acrylate, ethyl acrylate, butyl acrylate, 2-ethylhexyl acrylate, methyl methacrylate, ethyl methacrylate and butyl methacrylate; and (3) mono-and di-ethylenically unsaturated hydrocarbons, such as ethylene, isobutylene, styrene, and aliphatic dienes, such as butadiene, isoprene, and chloroprene.

The vinyl esters include poly(vinyl acetate) and copolymers of vinyl acetate with one or more of the following monomers: vinyl chloride, vinylidene chloride, styrene, vinyltoluene, acrylonitrile, methacrylonitrile, one or two of the acrylic and methacrylic acid esters mentioned. Similarly copolymers of one or more of the acrylic or methacrylic acid esters mentioned above with one or more of the following monomers: vinyl acetate, vinyl chloride, vinylidene chloride, styrene, vinyltoluene, acrylonitrile, and methacrylonitrile are also conventionally used in water based paints. Homopolymers of ethylene, isobutylene, and styrene, and copolymers of one or more of these hydrocarbons with one or more esters, nitriles or amides of acrylic acid or of methacrylic acid or with vinyl esters, such as vinyl acetate and vinyl chloride, or with vinylidene chloride are also used. The diene polymers are generally used in water based paints in the form of copolymers with one or more monomers following: sytrene, vinyltoluene, acrylonitrile, methacrylonitrile, and the above mentioned esters of acrylic acid or methacrylic acid. In a preferred embodiment of this invention, a small amount, such as from 0.5 to 5.0 weight % or more, preferably about 1.0 weight %, of an acid monomer is included in the monomer mixture used for making the copolymers. Acids used include acrylic, methacrylic, itaconic, aconitic, citraconic, crotonic, maleic, fumaric, the dimer of acrylic acid, and so on.

The latex polymer can also be a sequential emulsion polymer, such as for example, a core/shell polymer with the reactable group located on the shell or the relatively more hydrophilic portion of the polymer.

Most preferably, the latex polymer is an anionically stabilized emulsion polymer with a negative surface potential of $-10$ millivolts and higher (higher as used herein means more negatively charged, such as for example, $-20$ millivolts), as determined by zeta potential measurements.

The average "particle size" or diameter of the emulsion polymer may be from about 30 to about 800 nanometers, more preferably from about 90 to about 500 nanometers, and most preferably about 200 nanometers. The "particle size", as used herein, is the weight average diameter expressed in nanometers, can be determined by electron microscopy. In general, the molecular weights of these emulsion polymers are typically from about 100,000 to 5 million weight average and most commonly above 500,000.

The modifying compound must contain at least one water soluble group which includes, for example, polyoxyethylene, polyvinyl alcohol, polyacrylamide, poly N-vinyl pyrrolidone, or a natural polymer such as starch. The modifying compound must also contain a second reactable group which is complementary to the first reactable group in the latex polymer. In addition, the modifying compound may contain more than one complementary reactable group. By "complementary", we mean that the modifying compound and the latex polymer become chemically bound by the reactive interaction of the respective reactable groups.

A preferred modifying compound is an amphiphilic compound having ionizable or acid-base reactable groups. Useful amphiphilic compounds have both hydrophobic and hydrophilic groups. The hydrophobic portion of the amphiphilic compound must contain at least 4 carbon atoms, and can be branched, straight chain, aromatic, saturated or unsaturated. The hydrophilic portion of the amphiphilic compound is water soluble and may include polyoxyethylene, polyoxypropylene, polyacrylamide, or polyvinyl alcohol. The weight average molecular weight, $M_w$, of the amphiphilic compound is less than about 10,000.

Useful amphiphilic compounds may include quaternary ammonium salts, such as for example, quaternary salt of Ethomeen® 0/25 supplied by Akzo Chemicals Inc. This salt is a quaternary polyethoxylated ammonium salt with the formula $C_{18}H_{35}(CH_3)N(CH_2CH_2O)_xH(CH_2CH_2O)_yH(I)$ where $x+y=15$ and a molecular weight of about 942. The quaternary salt contains a positively charged nitrogen group which can form a complementary pair with a latex polymer containing an anionic group, such as for example, a carboxylate group.

Triton® RW-150 supplied by Union Carbide Company with the formula $t-C_{12-14}NH(CH_2CH_2O)_{15}H$ is a polyethoxylated amine which is another useful amphiphilic compound. A preferred amphiphilic compound is a tertiary polyethoxylated amine with the formula $C_{18}H_{37}N(CH_2CH_2O)_xH(CH_2CH_2O)_yH(x+y=15)$ and a molecular weight of about 929 (Ethomeen® 18/25 supplied by Akzo Chemical Inc.). The amine base is the second reactable group which is combined and reacted with a latex containing an acid as the first reactable group.

A preferred covalently bonded pair of complementary reactable groups is a JEFFAMINE® ED-600 (supplied by the Texaco Chemical Company) modifying compound reacted with an acetoacetate containing latex. (see Example 13). JEFFAMINE® ED-600 is a polyether diamine based on a predominately polyethylene oxide backbone. The amine (JEFFAMINE® ED-600) is the second reactable group which is reacted with a latex containing acetoacetate as the first reactable group.

There are several ways to combine the latex polymer and selected modifying compound in the aqueous coating. An aqueous coating can be formulated with the latex polymer, and then the modifying compound can be added as an additive to the aqueous coating. It is preferred that the modifying compound is first combined with the latex polymer, stirred until blended with the latex polymer, such as for example, on the order of at least 10 minutes. After stirring, the latex polymer and modifying compound may be left to equilibrate, such as for example, overnight. Then an aqueous coating is formulated with the mixture of the modifying compound and the latex.

The modifying compound containing the second reactable group is added to the latex polymer at the level of from 0.01 to about 10 molar equivalent, based on the molar equivalent of the first reactable group in the latex polymer. More preferably, the modifying compound is added to the latex polymer at the level of from 0.1 to 1.0 molar equivalent.

The concentration of the modifying compound in the final aqueous coating is from 0.1 to 10% by weight solids, based on the total weight solids of the latex polymer in the aqueous coating, preferably is from 2 to 10% weight solids, and most preferably is from 4 to 8% weight solids.

In general, a gallon of emulsion paint contains from about 0.5 to 3 pounds of latex polymer solids and from about 0.2 to about 5 pounds of finely-divided pigment. Typical pigments are titanium dioxide and other titanium pigments, white lead, zinc oxide, zinc sulfide, barium sulfate, calcium carbonate, lithopone, silica, talc, mica, clays, iron oxide, carbon black, cadmium sulfide, toluidene red, chrome orange, chrome yellow, chrome green, and others known in the art. Other synthetic pigments may also be included such as for example, ROPAQUE® opaque polymer. Sometimes driers are added, such as for example, cobalt and manganese, to coatings that contain unsaturated polymers which cure by oxidation. Minor amounts of other coatings additives may also be included in the paint formulations, such as for example, defoamers, anti-foams, coalescents, surfactants, dispersants, mildewcides, thickeners, wetting agents, biocides, and the like.

The open time of the aqueous coating may be measured by brush applying the coating to a substrate and determining the time when additional fresh paint does not melt in or blend well visually with a previously applied, wet coated substrate. By this, we mean that the test can be done by overlapping a second coat over a first coat at three minute intervals (see Illustrative Example 3), and determining the maximum time (open time) before which flow, leveling, and brush marks are noticeably different in the overlapped area compared to the first coat. The test can also be done by painting a second coat parallel to and over the first coat at 5 minute intervals, and determining the maximum time (open time) at which the second coat of paint does not show defects in the dried coating including brush marks, loss of gloss, and surface damage (see Example 6). In another open time method, crosses in the shape of an X are etched into a freshly coated substrate, and then a second coat of paint is brushed over and perpendicular to a cross etched in the first coat at 3 minute intervals (See Example 9). The open time for this test is defined as the maximum time at which the etched crosses are not visible.

The following examples are intended to illustrate the method of improving the open time of an aqueous coating, to which this invention is directed.

EXAMPLE 1

Preparation of Latex/Modifying Compound Blend:Sample 1

26.45 grams of a modifying compound (Ethomeen® 18/25 at 33% by weight solids) was added to 519.65 grams of an aqueous emulsion (41.4% by weight solids)

containing a 49% 2-Ethyl-hexyl acrylate(EHA)/23% Styrene (St)/27% Acrylonitrile(AN)/1.0% Methacrylic acid (MAA) latex The methacrylic acid was the first reactable group and the amine (Ethomeen® 18/25) was the second reactable group. At room temperature, the mixture was stirred for 10 minutes and equilibrated overnight to allow the first reactable group and second reactable group to react.

EXAMPLE 2

Preparation of the Aqueous Coating with Sample 1

A control paint was made in a standard paint formulation as shown with a 49%EHA/23%St/27%AN/1.0%MAA emulsion polymer without a modifying compound (41.4% by weight solids). Sample 1 was evaluated in the same paint formulation.

| Ingredient | Amount (parts by weight | |
|---|---|---|
| | Control Paint | Paint containing Sample 1 |
| Mix in Cowls Dissolver | | |
| Propylene Glycol | 70 | 70 |
| Dispersant | 35 | 35 |
| Defoamer | 4.2 | 4.2 |
| Biocide | 1.7 | 1.7 |
| Neutralizing Base | 0.8 | 0.8 |
| Polyurethane Thickener | 29.4 | 29.4 |
| Rutile Titanium Dioxide | 250.0 | 250.0 |
| Water | 38.9 | 15.6 |
| Latex | 547.8 | — |
| Sample 1 Latex Blend | — | 545.7 |
| Coalescent | 22.7 | 22.7 |
| Defoamer | 2.5 | 2.5 |
| Neutralizing Base | 1.4 | 0.6 |
| Polyurethane Thickener | 38.0 | 56.7 |

Pigment Volume Concentration = 22.68%
Volume Solids = 33.07%

EXAMPLE 3

Measurement of Open Time for the Paint Containing Sample 1

Open time was measured as follows. The control paint and the paint containing Sample 1 were both separately brushed out lengthwise on half of a coated paper chart (12H Spreading Rate Leneta Chart) using a natural spread rate. At three minute intervals, a second coat of each test paint was brushed lengthwise, in separate sections, from an unpainted area of the chart into the first coat to overlap at least half of the first coat. The paints were dried at 70° F. and 50% relative humidity for 24 hours. The open time was defined as the maximum time at which the second coat of paint blended in well with the first coat at the overlap. By this, we mean that this maximum time (open time) was established as the last three minute interval before which flow, leveling, and brushmarks of the overlapped area were noticeably different than the first coat.

The results of the open time test for the control paint and the paint containing Sample 1 are shown in Table 1:

TABLE 1

| OPEN TIME RESULTS | | |
|---|---|---|
| | Control Paint | Paint containing Sample 1 |
| Open time (minutes) | 3 | 12 |

The control paint had an open time of 3 minutes and noticeable differences in flow, leveling, and brush marks in the overlapped area compared to the first coat at 6 minutes and longer. The paint made with Sample 1 (EHA/St/AN latex blended with Ethomeen® 18/25) had an open time of 12 minutes and noticeable differences in flow, leveling, and brush marks in the overlapped area compared to the first coat at 15 minutes and longer.

EXAMPLE 4

Preparation of Latex/Modifying Compound Blend: Sample 2

Preparation of the Quaternary Salt of Ethomeen® 0/25

To 102 grams of Ethomeen® 0/25 was added 29.3 grams of methyl iodide. The mixture was stirred and heated to 80° C. for 6 hours. The resulting product was the quaternary salt of Ethomeen® 0/25.

48.56 grams of a modifying compound (quaternary salt of Ethomeen® 0/25 at 19.35% by weight solids) was added to 469.74 grams of an aqueous emulsion (50.0% by weight solids) containing a 46% Butyl acrylate (BA)/53% Methyl methacrylate (MMA)/1.0% Methacrylic acid (MAA) latex. At room temperature, the mixture was stirred for 10 minutes and equilibrated overnight to allow the first reactable group and second reactable group to react.

EXAMPLE 5

Preparation of the Aqueous Coating with Sample 2

A control paint was made in the paint formulation as shown with a 46%BA/53%MMA/1.0%MAA emulsion polymer without a modifying compound (50.0% by weight solids). Sample 2 was evaluated in the same formulation with the exception of the addition of cobalt and manganese driers to the paint.

| Ingredient | Amount (parts by weight | |
|---|---|---|
| | Control Paint | Paint containing Sample 2 |
| Mix in Cowls Dissolver | | |
| Propylene Glycol | 72 | 72 |
| Dispersant | 13.9 | 13.9 |
| Defoamer | 1.0 | 1.0 |
| Rutile Titanium Dioxide | 267.6 | 267.6 |
| Water | 5.0 | 5.0 |
| Water | 168.9 | 62.1 |
| Latex | 489.1 | — |
| Sample 2 Latex Blend | — | 518.3 |
| Coalescent | 24.5 | 24.4 |
| Aqueous Cobalt Drier | — | 4.9 |
| Aqueous Manganese Drier | — | 4.9 |
| Defoamer | 1.0 | 1.0 |
| Polyurethane Thickener | 25.6 | 98.2 |

Pigment Volume Concentration = 23.65%
Volume Solids = 33.95%

EXAMPLE 6

Measurement of Open Time for the Paint Containing Sample 2

Open time was measured as follows. Each of the control paint and paint containing Sample 2 was brushed out lengthwise on a sealed chart using a natural spread rate. After 5, 10, 15, and 20 minute intervals, a second coat of each test paint was brushed out on ¼ of the chart, parallel to and on top of the first coat in separate sections of the chart. The paints were dried at 70° F. and 65% relative humidity. Open time was defined as the maximum time at which the second coat of paint did not show defects in the dried coating including brush marks, loss of gloss, and surface damage. By surface damage, we mean that the dried coating was destroyed or ripped.

The results of the open time test for the control paint and the paint containing Sample 1 are shown in Table 2.

TABLE 2

| OPEN TIME RESULTS | | |
|---|---|---|
| | Control Paint | Paint containing Sample 2 |
| Open time (minutes) | <5 | 15 |

The control paint had an open time of less than 5 minutes and had defects in the dried second coat at 5 minutes and longer. The paint made with Sample 2 (BA/MMA/MAA latex blended with the quaternary salt of Ethomeen ® 0/25) had an open time of 15 minutes and had defects in the dried second coat at 20 minutes and longer.

EXAMPLE 7

Preparation of Latex/Modifying Compound Blend: Sample 3

27.9 grams of a modifying compound (TRITON ® RW-150 at 33% by weight solids) was added to 500 grams of an aqueous emulsion (46% by weight solids) containing a 46% Butyl acrylate (BA)/53% Methyl methacrylate (MMA)/1.0% Methacrylic acid (MAA) latex. At room temperature, the mixture was stirred for 10 minutes and equilibrated overnight to allow the first reactable group and second reactable group to react.

EXAMPLE 8

Preparation of the Aqueous Coating with Sample 3

A control paint was made in the paint formulation as shown with a 46%BA/53%MMA/1.0%MAA emulsion polymer without a modifying compound (46% by weight solids). Sample 3 was formulated in the same formulation.

| | Amount (parts by weight | |
|---|---|---|
| Ingredient | Control Paint | Paint containing Sample 3 |
| Mix in Cowls Dissolver | | |
| Propylene Glycol | 20.3 | 20.3 |
| Dispersant | 35 | 35 |
| Defoamer | 4.2 | 4.2 |
| Biocide | 1.7 | 1.7 |
| Methyl Carbitol | 16.8 | 16.8 |
| Neutralizing Base | 0.8 | 0.8 |
| Polyurethane Thickener | 29.4 | 29.4 |
| Rutile Titanium Dioxide | 250 | 250 |
| Water | 110.8 | 121.5 |
| Latex | 519.6 | — |
| Sample 3 Latex Blend | — | 536.4 |
| Coalescent | 17.4 | 19.4 |
| Defoamer | 2.6 | 2.6 |
| Neutralizing Base | 2.5 | — |
| Polyurethane Thickener | 39.4 | 53.5 |

Pigment Volume Concentration = 22.68%
Volume Solids = 33.07%

EXAMPLE 9

Measurement of Open Time for the Paint Containing Sample 3

Open time was measured as follows. Each of the control paint and paint containing Sample 3 (46%BA/53%MMA/1.0%MAA latex blended with TRITON ® RW-150) was brushed out lengthwise on approximately 2 inch width section of a sealed chart. Crosses in the shape of an X were immediately etched in the paint film from top to bottom using a tongue depressor. At three minute intervals, a second coat of each test paint was brushed over and perpendicular to a cross etched in the first coat. The open time was defined as the maximum time at which the etched crosses were not visible. By this we mean that this maximum time (open time) is the last three minute interval before which the etched cross was visible in the dried paint film.

The results of the open time test for the control paint and the paint containing Sample 3 are shown in Table 3.

TABLE 3

| OPEN TIME RESULTS | | |
|---|---|---|
| | Control Paint | Paint containing Sample 3 |
| Open time (minutes) | 3 | 9 |

The control paint had an open time of 3 minutes and the crosses were visible in dried coating at 6 minutes and longer. The paint made with Sample 3 had an open time of 9 minutes and the etched crosses were visible in the dried coating at 12 minutes and longer.

EXAMPLE 10

Preparation of Latex/Modifying Compound Blend: Sample 4 a) Preparation of Aldehyde-terminated Polyvinyl Alchohol

To 600 grams of a 20% by weight solution of polyvinyl alcohol in water (Airvol ® 203 supplied by Air Products), was added 16.0 grams of sodium periodate. The mixture was stirred at room temperature for 3 hours to form an aldehyde-terminated (second reactable group) polyvinyl alcohol.

b) Combination of Aldehyde-terminated Polyvinyl Alcohol with BA/MMA/AAEM/MAA latex 115 grams of a 20% by weight solution of aldehyde-terminated polyvinyl alcohol was added to 400 grams of an aqueous emulsion (45.8% by weight solids) containing a 39% Butyl acrylate (BA)/50% Methyl methacrylate (MMA)/9% Acetoacetoxy ethyl methacrylate (AAEM)/2% Methacrylic acid (MAA) latex. The AAEM was the first reactable group. The mixture was stirred at room temperature for 6 hours to allow the complementary aldehyde and acetoacetate groups to react.

EXAMPLE 11

Preparation of the Aqueous Coating with Sample 4

A control paint was made in the paint formulation as shown with a 39%BA/50%MMA/9%AAEM/2.0%MAA emulsion polymer without a modifying compound (46.2% by weight solids). Sample 4 was formulated in the same formulation.

| | Amount (parts by weight | |
|---|---|---|
| Ingredient | Control Paint | Paint containing Sample 4 |
| Mix in Cowls Dissolver | | |
| Propylene Glycol | 70 | 70 |
| Dispersant | 35 | 35 |
| Defoamer | 4.2 | 4.2 |

-continued

| Ingredient | Amount (parts by weight) | |
|---|---|---|
| | Control Paint | Paint containing Sample 4 |
| Biocide | 1.7 | 1.7 |
| Neutralizing Base | 0.8 | 0.8 |
| Polyurethane Thickener | 29.4 | 29.4 |
| Rutile Titanium Dioxide | 250.0 | 250.0 |
| Water | 87.0 | 34.4 |
| Latex | 525.6 | — |
| Sample 4 Latex Blend | — | 598.4 |
| Coalescent | 17.0 | 17.6 |
| Defoamer | 2.5 | 2.5 |
| Neutralizing Base | — | 1.7 |
| Polyurethane Thickener | 33.0 | 19.7 |

Pigment Volume Concentration = 22.68%
Volume Solids = 33.07%

EXAMPLE 12

Measurement of the Open Time of the Paint Containing Sample 4

Open time was measured using the procedure described in EXAMPLE 3. The results are shown in Table 4.

TABLE 4
OPEN TIME RESULTS

| | Control Paint | Paint containing Sample 4 |
|---|---|---|
| Open time (minutes) | 3 | 6–9 |

The control paint had an open time of 3 minutes and noticeable differences in flow, leveling, and brush marks in the overlapped area compared to the first coat at 6 minutes and longer. The paint made with Sample 4 (BA/MMA/AAEM/MAA emulsion blended with an aldehyde-terminal polyvinyl alcohol) had an open time of from 6 minutes to about 9 minutes. By this, we mean that there was no noticeable differences in flow, leveling, and brush marks in the overlapped area compared to the first coat at 6 minutes, and there were slight differences in flow, leveling, and brush marks at 9 minutes. At 12 minutes and longer, there were distinct differences in flow, leveling, and brush marks in the overlapped area compared to the first coat.

EXAMPLE 13

Preparation of Latex/Modifying Compound Blend:Sample 5

25.6 grams of a modifying compound (JEFFAMINE ® ED-600 at 45.6% by weight solids) was added to 511.6 grams of an aqueous emulsion (45.6% by weight solids) containing a 39% Butyl acrylate (BA)/50% Methyl methacrylate (MMA)/9% Acetoacetoxy ethyl methacrylate (AAEM)/2% Methacrylic acid (MAA) latex. At room temperature, the mixture was stirred for 10 minutes and equilibrated overnight to allow the first and second reactable groups to react.

EXAMPLE 14

Preparation of the Aqueous Coating with Sample 5

A control paint was made in the paint formulation shown with a 39%BA/50%MMA/9%AAEM/2%MAA emulsion polymer without a modifying compound (45.6% by weight solids). Sample 5 was formulated in the same formulation.

| Ingredient | Amount (parts by weight) | |
|---|---|---|
| | Control Paint | Paint containing Sample 5 |
| Mix in Cowls Dissolver | | |
| Propylene Glycol | 70 | 70 |
| Dispersant | 35 | 35 |
| Defoamer | 4.2 | 4.2 |
| Biocide | 1.7 | 1.7 |
| Neutralizing Base | 0.8 | 0.8 |
| Polyurethane Thickener | 29.4 | 29.4 |
| Rutile Titanium Dioxide | 250.0 | 250.0 |
| Water | 78.8 | 70.0 |
| Latex | 532.6 | — |
| Sample 5 Latex Blend | — | 537.2 |
| Coalescent | 24.2 | 24.2 |
| Defoamer | 2.5 | 2.5 |
| Neutralizing Base | 3.0 | 2.0 |
| Polyurethane Thickener | 24.8 | 26.0 |

Pigment Volume Concentration = 22.68%
Volume Solids = 33.07%

EXAMPLE 15

Measurement of Open Time for the Paint Containing Sample 5

Open time was measured using the procedure described in EXAMPLE 3. The results are shown in Table 5.

TABLE 5
OPEN TIME RESULTS

| | Control Paint | Paint containing Sample 5 |
|---|---|---|
| Open time (minutes) | 3 | >12 |

The control paint had an open time of 3 minutes and noticeable differences in flow, leveling, and brush marks in the overlapped area compared to the first coat at 6 minutes and longer. The paint made with Sample 5 (BA/MMA/AAEM/MAA emulsion blended with JEFFAMINE ® ED-600) had an open time greater than 12 minutes. By this, we mean that there were no noticeable differences in flow, leveling, and brush marks in the overlapped area compared to the first coat at 12 minutes. Since the test method was run up to 12 minutes, the open time of the paint made with Sample 5 occurred after 12 minutes.

What is claimed is:

1. A method for extending the open time of an aqueous coating comprising:
   (a) selecting a latex polymer with a first reactable groups;
   (b) selecting a modifying compound with a second reactable group which is complementary to the first reactable group in the latex polymer;
   (c) forming an aqueous coating by combining the latex polymer and modifying compound; and
   (d) applying said aqueous coating composition to a substrate.

2. An aqueous coating composition having extended open time comprising a latex polymer and a modifying compound where the latex polymer consists of a first reactable group which is complementary to and combined with a second reactable group in the modifying compound.

3. A method of using a modifying compound containing a reactable group for extending the open time of an aqueous coating composition containing a latex polymer having a reactable group which is complementary to the reactable group in the modifying compound.

4. The method of claims 1 or 3 and the coating composition of claim 2 where the concentration of the modifying compound is from 0.1 to about 10 percent by weight solids, based on the total weight solids of the latex polymer in the aqueous coating composition.

5. The composition of claim 2 where the modifying compound is an amphiphilic compound further comprising a hydrophobic portion with at least 4 carbon atoms.

6. The composition of claim 5 where the amphiphilic compound has a weight average molecular weight less than about 10,000.

7. The composition of claim 5 where the complementary reactable groups in the latex polymer and amphiphilic compound are an ionizable pair selected from the group consisting of positively and negatively charged atoms, and acids and bases.

8. The composition of claims 1 or 2 where the complementary reactable groups in the latex polymer and modifying compound are selected from the group consisting of:
(a) acetoacetate-aldehyde;
(b) acetoacetate-amine;
(c) amine-aldehyde;
(d) amine-anhydride;
(e) amine-isocyanate;
(f) amine-epoxy;
(g) aldehyde-hydrazide;
(i) acid-epoxy;
(j) acid-carbodiimide;
(k) acid-chlor methyl ester;
(m) acid-anhydride;
(n) acid-aziridine;
(o) epoxy-mercaptan; and
(p) isocyanate-alcohol,
wherein a group in each pair is present in the latex polymer and the complementary reactable group is present in the modifying compound.

9. The composition of claim 5 where the latex polymer comprises from 0.5% to about 10% by weight of the total composition of an ionizable acid group.

10. The composition of claim 5 where the latex polymer comprises from 0.5% to about 5% by weight of the total composition of an ionizable acid group.

11. The latex polymer of claims 1 or 2 is a polymer selected from the group consisting of acrylic, styrene acrylic, stryene butadiene, and vinyl acetate polymeric latexes.

12. The latex polymer of claim 10 where the latex polymer has an average particle size from about 30 to about 800 nanometers.

13. The composition of claim 11 where the latex polymer has an average particle size from about 90 to about 500 nanometers.

14. The method of claim 1 where the aqueous coating comprises the second reactable group in the modifying compound covalently bonded to the complementary first reactable group in the latex polymer.

* * * * *